United States Patent [19]

Hatamura

[11] Patent Number: 4,576,053
[45] Date of Patent: Mar. 18, 1986

[54] LOAD DETECTOR

[76] Inventor: Yotaro Hatamura, 12-11, Kohinata 2-chome, Bunkyo-ku, Tokyo, Japan

[21] Appl. No.: 591,490

[22] Filed: Mar. 20, 1984

[51] Int. Cl.$^4$ ............................................. G01L 1/22
[52] U.S. Cl. ...................................... 73/862.66; 338/5
[58] Field of Search ........................ 73/862.66, 862.65; 338/2, 3, 5

[56]  References Cited

U.S. PATENT DOCUMENTS

| | | | |
|---|---|---|---|
| 3,620,074 | 11/1971 | Laimins et al. | 73/862.66 |
| 3,695,096 | 10/1972 | Kutsay | 73/862.66 |
| 4,362,053 | 12/1982 | Barrett | 73/121 |
| 4,364,279 | 12/1982 | Stern et al. | 73/862.66 |
| 4,420,985 | 12/1983 | Raskin | 73/862.66 |

Primary Examiner—Donald O. Woodiel
Attorney, Agent, or Firm—Oblon, Fisher, Spivak, McClelland & Maier

[57] ABSTRACT

A load detector which includes a pin-like member arranged between force-transmitting members, a hole formed in the pin-like member along its neutral axis for bending deformations thereof, an insertion member inserted in the hole and having at both end parts thereof securement portions and at a central part thereof one or more deformation-sensing portions which are provided with their axis of symmetry coincident with the neutral axis of the pin-like member, are responsive to each load applied to the pin-like member, undergo deformations and hence enlarge the resulting strain, and a mechanism for converting the extent of deformation of the deformation-sensing portions into signals so as to obtain only portion of the resulting strain which portion has been produced by each shear deformation of the pin-like member. Owing to the position of the hole, the pin-like member has sufficient strength and rigidity and can thus be used as a connecting pin or bolt. The load detector can detect loads with high sensitivity even if the points of action of the loads change.

8 Claims, 24 Drawing Figures

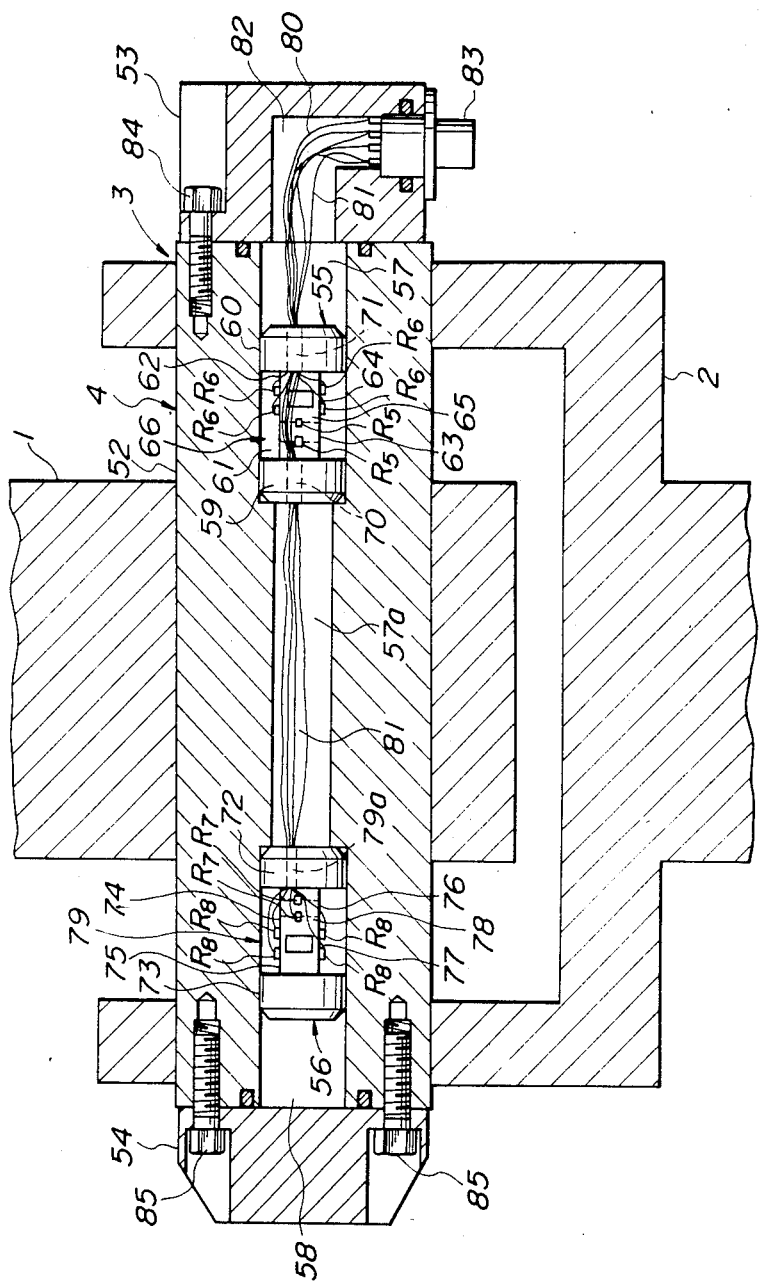

LOAD DETECTOR

BACKGROUND OF THE INVENTION

1. Field of the Invention

This invention relates to a load detector which can detect loads with high accuracy insofar as it is important for the attainment of desired control of a machine to detect loads which each of the mechanical parts making up the machine receives.

2. Discussion of the Background

As to load detectors which have conventionally been used for the detection of such loads, reference may be made to U.S. Pat. Nos. 3,695,096 issued Oct. 3, 1972 to Ali Umit Kutsay, 4,165,637 issued Aug. 28, 1979 to William H. Kooman, and 4,199,978 issued Apr. 29, 1980 to Folke von Knorring et al. U.S. Pat. No. 3,695,096 discloses a strain detecting load cell formed of a coupling member such as pin or bolt, which member defines a hole along its central axis, and strain gauges bonded to the circumferential wall of the hole, to thereby detect a shear force corresponding to each load to be exerted to the coupling member. The strain detecting load cell of the above structure has poor detection sensitivity and is thus unable to detect with desired accuracy each load to be applied to the coupling member, because the wall thickness of the coupling member on which the strain gauges are bonded must be large in order to keep its strength at a sufficient level.

U.S. Pat. No. 4,165,637 discloses a force-transferring device in which two holes are formed along the central axis of a pin in such a way that a plane containing the central axes of these holes extends perpendicularly to the direction of action of each force, and strain gauges are provided on the inner walls of these holes so as to detect a shear force corresponding to each load to be applied to the pin. The above force-transferring device is accompanied by a potential danger that the strength and rigidity of the pin would be reduced due to the formation of two holes therethrough and may be broken or may develop undesirous deformations when applied with a large load, although it seems to be able to detect with desired accuracy loads to be applied to the pin as the pin has small cross-sectional areas at areas where the pins are respectively provided.

The inventions of U.S. Pat. Nos. 3,695,096 and 4,165,637 were both completed, fundamentally speaking, on the basis of the same technical concept. Namely, these inventions are able to enlarge shear strains (in other words, to improve the sensitivity) at pin portions, in which shear deformations occur, only by making the pin portions weaker. It is however required for almost all of ordinary applications to impart sufficient degrees of strength and rigidity to each pin and at the same time to improve its sensitivity as a sensor while maintaining the dimensions of the pin at conventional levels. Neither U.S. Pat. No. 3,695,096 nor U.S. Pat. No. 4,165,637 is effective for this purpose.

On the other hand, U.S. Pat. No. 4,199,978 discloses forming a hole along the length of an elongated member and to arrange a transducer, which has attachment parts at both ends thereof and a measuring part at a location between both ends thereof, in the hole in such a way that the attachment parts are symmetrical relative to the point of action of each load, to thereby measure the angle between two tangents to an elastic deformation line to be developed in the elongated member by the load. It is indispensable in the above structure to arrange the attachment parts symmetrically relative to the point of action of each load. Accordingly, the installation of the transducer must be conducted with special care. It is thus accompanied by a potential danger that some detection errors may arise due to possible offset of the installation position. In general machine parts or the like, the points of action of loads may often change. This also leads to detection errors. Consequently, certain limitations are imposed on the apparatus or method of the U.S. patent, with respect to applicable machine parts.

SUMMARY OF THE INVENTION

The present invention has been completed by taking such problems of the prior art techniques into consideration.

An object of this invention is thus to provide a load detector which is capable of maintaining sufficient degrees of detection sensitivity, strength and rigidity and which does not develop detection errors even if the points of action of loads changes.

In one aspect of this invention, there is thus provided a load detector which comprises:

a pin-like member arranged between force-transmitting members and adapted to receive a load;

a hole formed in the pin-like member along its neutral axis for bending deformations thereof;

an insertion member inserted in the hole and having at both end parts thereof securement portions coupled with the pin-like member and at a central part thereof one or more deformation-sensing portions which are provided with their axis of symmetry coincident or nearly coincident with the neutral axis of the pin-like member, are responsive to each load applied to the pin-like member, undergo deformations and hence enlarge the resulting strain; and means for converting the extents of deformations of the deformation-sensing portions of the insertion member into signals so as to obtain only a portion of the resulting strain which portion has been produced by each shear deformation of the pin-like member.

In the load detector of this invention, the insertion members each having one or more deformation-sensing portions, which are responsive to each load applied to the pin-like member arranged between the force-transmitting members, undergo deformations and hence enlarge the resulting strain. The signal-producing means adapted to obtain only a portion of the resulting strain which portion has been produced by each shear deformation of the pin-like member are disposed within the pin-like member. The insertion members are provided respectively with the force-transmitting paths between the force-transmitting members and the deformation-sensing portions are arranged with their axis of symmetry nearly coincident with the neutral axis of the pin-like member for bending deformations. Therefore, each load applied to the pin-like member can be obtained with high accuracy in terms of strain, which has been caused by the resulting shear deformation of the pin-like member, by means of the deformation-sensing portions and signal-producing means without need for changing the diameter of the pin-like member and, accordingly, the load applied to the pin-like member can be detected with high accuracy as compared with conventional load detectors.

Since the hole is formed along the neutral axis of the pin-like member for bending deformations, namely, in a portion having little influence on the strength and rigidity of the pin-like member and the insertion member is disposed in the hole, the pin-like member is allowed to retain sufficient strength and rigidity and can thus withstand great loads.

The present invention has brought about another advantageous effect in that the pin-like member may be employed for a wide variety of purposes as a machine-constituting part such as a connecting pin because the detector does not produce any significant detection errors even if the points of action of loads vary from one another.

BRIEF DESCRIPTION OF THE DRAWINGS

The above and other objects, features and advantages of the present invention will become apparent from the following description and the appended claims, taken in conjunction with the accompanying drawings, in which:

FIG. 6(a) is a schematic illustration showing a deformation which has been produced in the insertion member due to a shear deformation of the load detector while FIG. 6(b) is a schematic illustration depicting a deformation which has been produced in the insertion member due to a bending deformation of the load detector;

FIG. 10 is a side elevational view of a load detector according to the third embodiment of this invention, a part of which is shown in cross-section;

DESCRIPTION OF THE PREFERRED EMBODIMENTS

Figure 1:
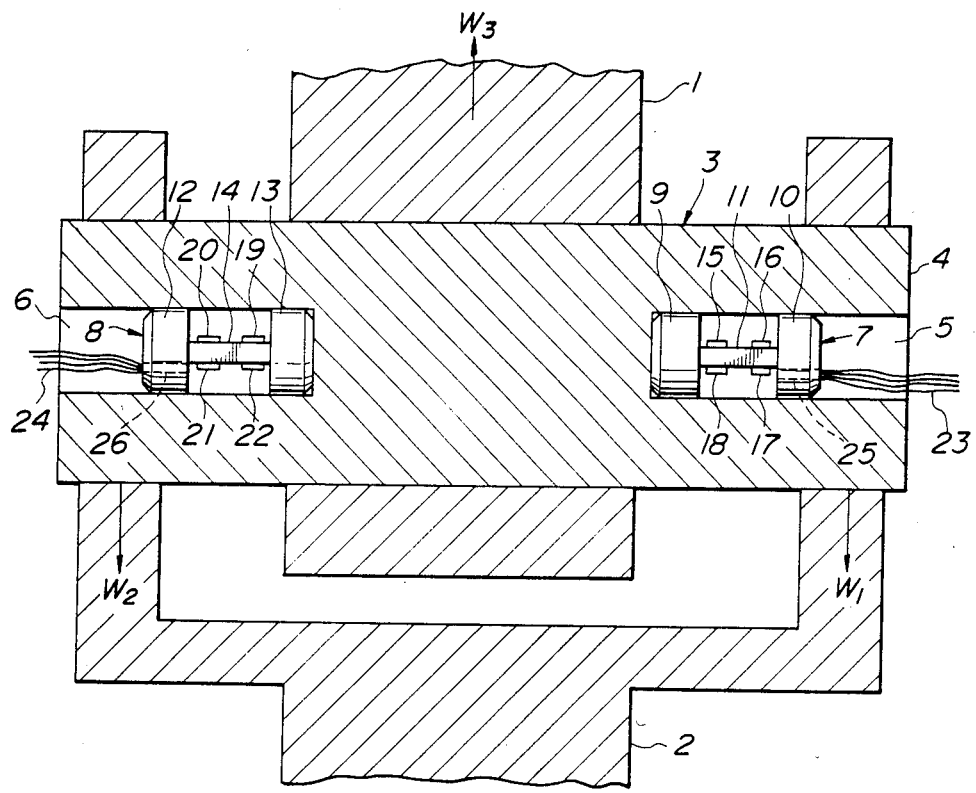
FIG. 1 is a side elevational view of a load detector according to the first embodiment of this invention, a part of which load detector is shown in cross-section.
Figure 2:
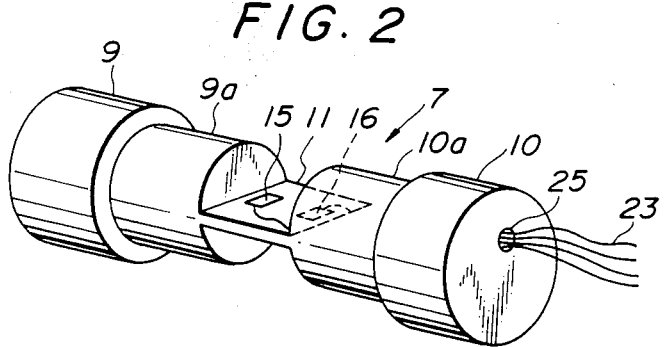
FIG. 2 is a perspective view illustrating an insertion member provided with the load detector of the first embodiment.

Referring first of all to FIG. 1, numerals 1,2 indicate force-transmitting members, namely, machine-constituting members respectively. Designated at numeral 3 is a load detector according to this invention, which also serves as a pin connecting the machine-constituting members 1,2 together. The load detector 3 is made, for example, of a cylindrical pin-like member 4, which defines two holes 5,6 formed with their axis of symmetry coincident or nearly coincident with the neutral axis of the pin-like member 4 and having circular cross-sections, and insertion members 7,8 which are inserted respectively in the holes 5,6 and are individually made for example of a metal. Incidentally, the insertion member 7 is disposed between the machine-constituting member 1 and one of the arms of the machine-constituting member 2, namely, on one of the force-transmitting paths, whereas the insertion member 8 is arranged between the machine-constituting member 1 and the other arm of the machine-constituting member 2, i.e., on the other force-transmitting path. As illustrated in FIG. 2, the insertion member 7 has at both end parts thereof securement portions coupled with the pin-like member 4, namely, securement portions 9,10 having cylindrical shapes of substantially the same diameters as the hole 5 so as to have surface-to-surface contact with the pin-like member 4 as shown in FIG. 1. In continuation with these securement portions 9,10, there are respectively provided fixing portions 9a,10a which have diameters smaller than those of the securement portions 9,10. The insertion member 7 is further provided at a central part thereof with a thin-walled deformation-sensing portion 11 which is responsive to each load to be exerted on the pin-like member 4, undergoes a deformation and hence enlarges the resulting strain. Similarly, the insertion member 8 has securement portions 12,13, fixing portions and a deformation-sensing portion 14. By the way, the lengthwise dimensions of the securement portions 9,10, fixing portions 9a,10a, deformation-sensing portion 11 and the hole 5 of the insertion member 7 are determined, as illustrated by way of example in FIG. 3, in such a way that a region lying between the inner walls of the securement portions 9,10 of the insertion member 7 and indicated by a distance L falls within a region extending between the side wall of the machine-constituting member 1 and the inner side wall of the corresponding arm of the machine-constituting member 2 and indicated by a distance L'. The deformation-sensing portions 11,14 are arranged with their axis of symmetry nearly coincident with the neutral axis for bending deformations and enlarge the resulting strain in proportion to their lengthwise dimensions, i.e., the distances between their corresponding fixing portions. By the way, the securement portions 9,10,12,13 of the insertion members 7,8 are coupled with the pin-like member 4 by such means as shrink-fitting, welding, fastening by tapered screws, fixing with an adhesive or the like.

Figure 4:
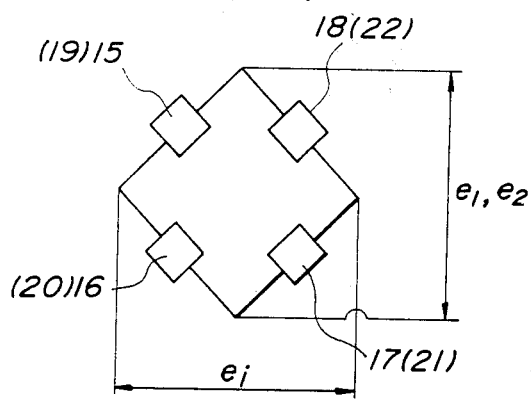
FIG. 4 is a connection diagram of strain gauges employed in the load detection of the first embodiment.

In addition, numerals 15,16,17,18 indicate means adapted to convert the extent of each deformation of the deformation-sensing portion 11 into signals. The means will hereinafter be called "signal-producing means", which may for example be strain gauges. Among these strain gauges, the strain gauges 15,16 are applied on the upper surface (as seen in FIG. 1) of the deformation-sensing portion 11 and along the axis of the pin-like member 4. On the other hand, the strain gauges 17,18 are applied on the lower surface (as seen in FIG. 1) of the deformation-sensing portion 11 and along the axis of the pin-like member 4. In other words, the strain gauges 15,16 and the strain gauges 17,18 are arranged at symmetric positions relative to the neutral axis for bending deformations of the pin-like member, so that their output signals relating to bending are cancelled out. Similarly, numerals 19,20,21,22 indicate strain gauges applied on the deformation-sensing portion 14. These strain gauges 15-18 and strain gauges 19-22 form individually bridges illustrated by way of example in FIG. 4. In FIG. 4, "$e_i$", "$e_1$" and "$e_2$" indicate an input voltage, an output voltage from the strain gauges 15-18 and an output voltage from the strain gauges 19-22, respectively. Numerals 23,24 indicate respectively leads which are connected respectively to the strain gauges 15-18 and the strain gauges 19-22. These leads 23,24 extend through through-holes 25,26 formed through the fixing portions and securement portions 10,12 of the insertion members 7,8. The leads 23,24 then extend through the holes 5,6 to the exterior of the pin-like member 4.

Figure 5:
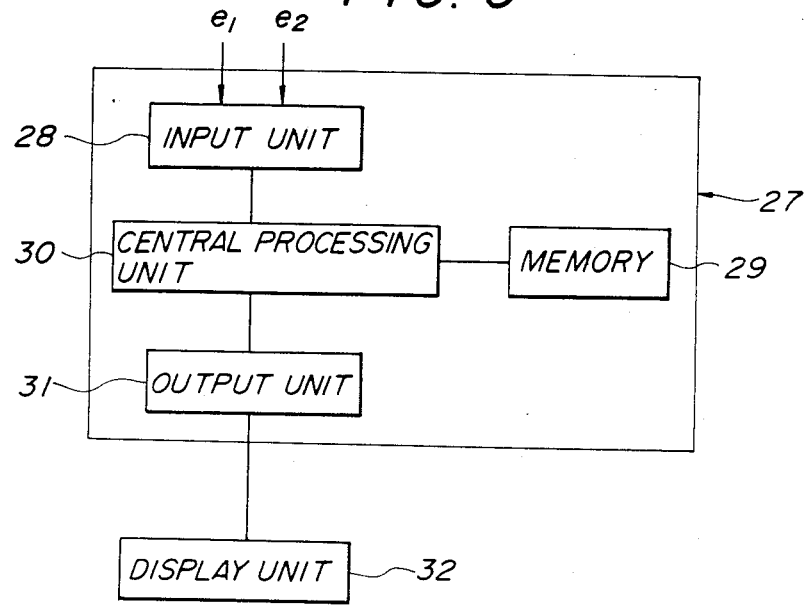
FIG. 5 is a block diagram of one example of a computing system connected to the load detector shown in FIG. 1.

FIG. 5 is a block diagram showing one example of a unit connected to the load detector 3 illustrated in FIG. 1. In FIG. 5, designated at numeral 27 is a computing unit which is for example composed of a microcomputer, which consists in turn of an input unit 28 adapted to receive each output voltages $e_1,e_2$ from the strain gauges 15-18 and 19-22, a memory 29 adapted to store the relationship between each output voltages $e_1,e_2$ of the strain gauges and the magnitude of each load, a CPU (central processing unit) 30 adapted to perform logical steps, operations and the like based on signals input to the input unit 28, and an output unit 31 adapted to output each result obtained at the CPU 30. Numeral 32 indicates a display unit which is connected to the output unit 31 and is composed of a display or the like. These computing unit 27 through display unit 32 make up signal-processing means which processes signals output from the load detector 3. However, it should be noted that the signal-processing means of the above type is, generally speaking, not limited to that illustrated in FIG. 5 but may take a variety of forms.

Figure 6A:
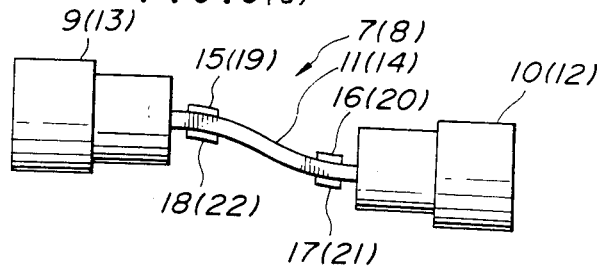
FIGS. 6(a) and 6(b) are schematic illustrations showing by way of example typical forms of deformations to be developed in the load detector shown in FIG. 1, namely.
Figure 6B:
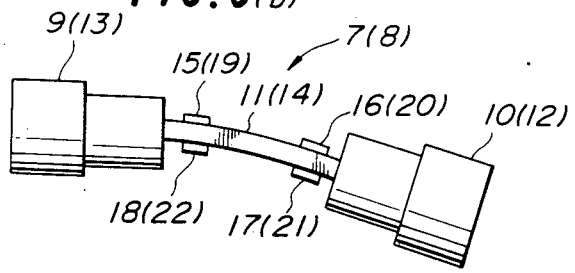

In the first embodiment constituted in the above-described manner, it is now supposed that an unknown force $W_3$ is applied to the machine-constituting member 1 and unknown forces $W_1,W_2$ are exerted on the machine-constituting member 2 as depicted in FIG. 1 ($W_3 = W_1 + W_2$). At the side of the insertion member 7 illustrated by way of example in FIG. 3, a deformation of the pin-like member 4 due to the force $W_1$ is transmitted to the insertion member 7 via the securement portions 9,10. Accordingly, the insertion member 7 undergoes a deformation $\delta$ over the distance L, out of the overall deformation of the pin-like member 4. The deformation of the pin-like member 4, namely, the deformation $\delta$ of the insertion member 7 over the distance L may include a deformation caused by a shear force as indicated in FIG. 6(a) and/or a deformation developed by a bending moment as depicted in FIG. 6(b).

Figure 3:
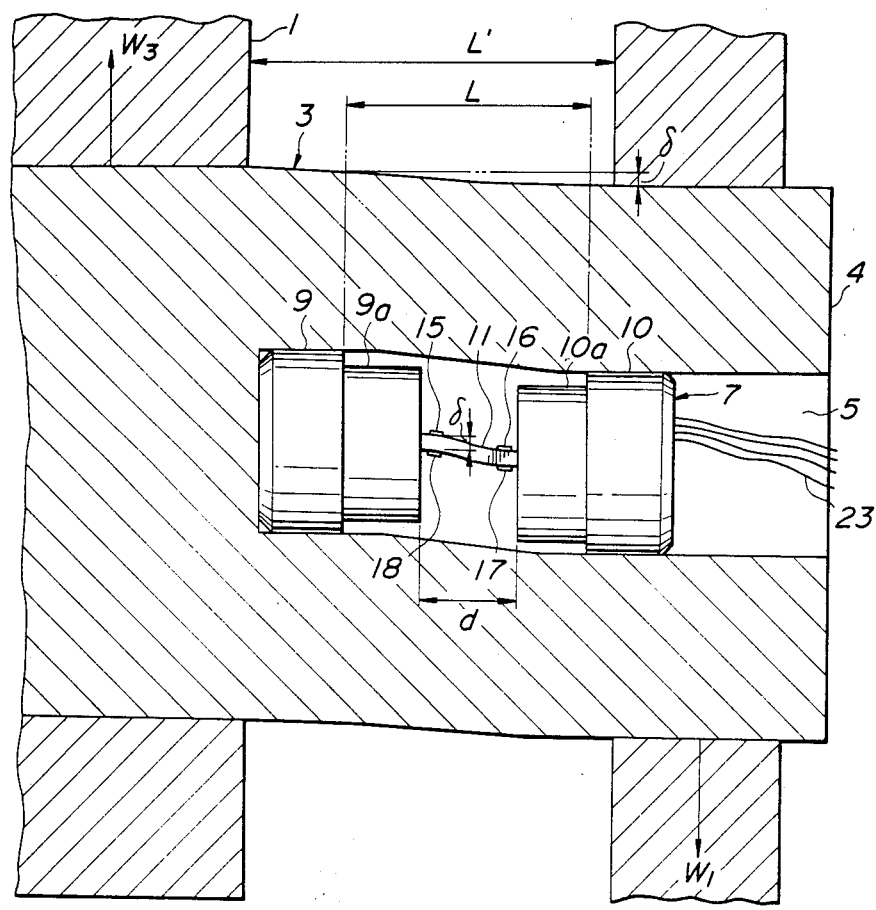
FIG. 3 is a schematic illustration showing, by way of example, one manner of deformation occurred in the load detector of FIG. 1.

Here, the deformation $\delta$ which has occurred over the distance L in the pin-like member 4 is in turn caused to appear along the length d in the deformation-sensing portion 11(14). In other words, the fixing portions 9a,10a are kept isolated from the wall of the hole 5 because the diameters of the fixing portions 9a,10a are designed, as shown in FIG. 3, smaller compared for example with the diameters of the securement portions of the insertion member 7. Accordingly, the fixing portions 9a,10a do not develop deformations by forces from the wall of the hole 5, but it is only the deformation-sensing portion 11 that undergoes a good deformation. This also applies to the insertion member 8. Then, the strain gauges 15(19),17(21) are elongated but the strain gauges 16(20),18(22) are shrunk as depicted in FIG. 6(a) when the load detector is deformed by a shear force. Since these strain gauges 15-18, 19-22 are connected into bridges as shown in FIG. 4, the voltages $e_1,e_2$ are output in proportion to the shear forces, namely, the forces $W_1,W_2$. Since the deformation-sensing portions 11,14 are arranged along the neutral axis for bending deformations, strains caused due to deformations by bending moments are thus kept at minimum levels. When a deformation takes place by the bending moment, the strain gauges 15(19),16(20) are elongated whereas the strain gauges 17(21),18(22) are shrunk as illustrated in FIG. 6(b). Since these strain gauges are connected to form the bridges shown in FIG. 4, the elongations and shrinkages are cancelled by each other and, as a result, there will be no significant signals produced by the deformation due to the bending moment. In other words, it is possible to detect only the shear force applied in a specific single direction through the upper and lower surfaces of the deformation-sensing portion 11 irrelevant to the deformation due to each bending moment, namely, without being affected at all by the positions of points where the forces $W_1,W_2$ are applied. Since the deformation-sensing portions 11,14 are formed into thin-walled plates, their rigidities are smaller than those of the fixing portions 9a,10a, thereby concentrating the overall deformation of the region L on the deformation-sensing portions 11,14 and thus enlarging their strains. Accordingly, the deformation-sensing portions 11,14 are assured to exhibit sufficient detection sensitivity.

The output voltages $e_1,e_2$ output respectively from the strain gauges 15-18 and 19-22 are processed in a unit, for example, in a unit illustrated in FIG. 5, thereby determining the forces $W_1,W_2$ which correspond respectively to the output voltages $e_1,e_2$. It is also possible to obtain the force $W_3$ as a result of an operation ($W_1 + W_2 = W_3$) at the CPU 30 if necessary. These forces $W_1,W_2$ or $W_3$ are output from the output unit 31 of the computing unit 27 to the display unit 32 and are then displayed there.

In the above-described detector according to the first embodiment of this invention, the holes 5,6 in which the insertion members 7,8 are respectively inserted are formed along the neutral axis for bending deformations of the pin-like member 4. Therefore, it is possible to minimise the reduction in strength of the pin-like member 4 due to the existence of the holes 5,6 to such a small extent that the reduction may practically be ignored. Namely, the maximum stress to be developed in the pin-like member 4 when a force is applied to the pin-like member 4 will appear as a bending stress. Thus, it is reasonable to evaluate the strength of the pin-like member 4 in terms of the bending stress. This bending stress increases generally in proportion to the cube of the diameter of the pin-like member 4. In the first embodiment in which the external dimensions, namely, the diameters of the pin-like member 4 is kept sufficiently large, it is possible to provide the pin-like member 4 with a sufficient degree of strength although the holes 5,6 are formed along the neutral axis for its bending deformations.

Additionally, in the first embodiment, the insertion member 7 is provided on the force-transmitting path between the right arm (as seen in FIG. 1) of the member 2 and the member 1 whereas the insertion member 8 is arranged on the force-transmitting path between the left arm (as seen in the same figure) of the member 2 and the member 1. In other words, an insertion member is provided for each force-transmitting path. This manner of arrangement of the insertion members was adopted taking into consideration that the positions of the points of action of loads may change. Where the positions of points of action of loads have already been known as being for example at the central position of the pin-like member 4 or at a position apart by one third of the entire length of the pin-like member from the right extremity thereof, it is possible to provide an insertion member with only one force-transmitting path instead of providing an insertion member for each force-transmitting path as mentioned above so that desired loads can be detected.

Figure 7A:
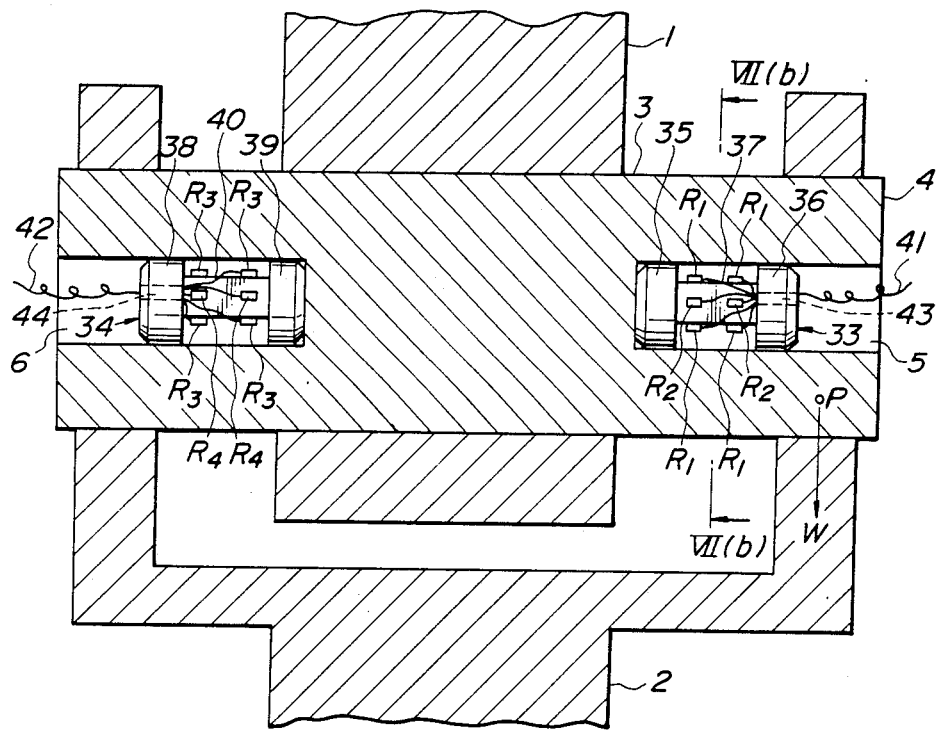
FIG. 7(a) is a side elevational view of a load detector according to the second embodiment of this invention, a part of which load detector is illustrated in cross-section.
Figure 7B:
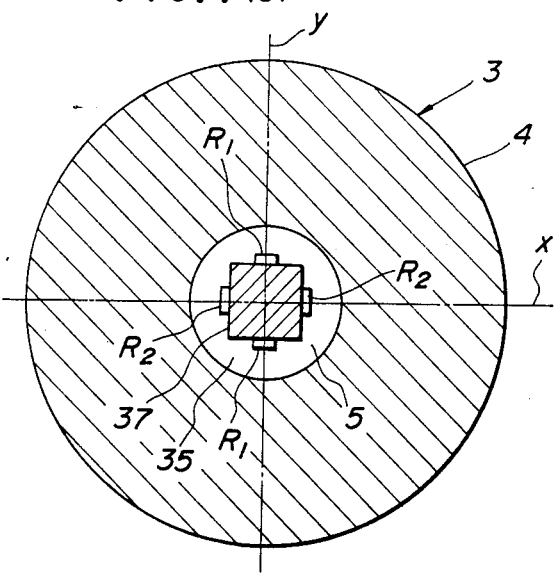
FIG. 7(b) is a cross-sectional view taken along line VII(b)—VII(b) of FIG. 7(a)

FIG. 7(a) is a side elevational view of a load detector according to the second embodiment of this invention, a part of which load detector is shown in cross-section. FIG. 7(b) is a cross-sectional view taken along line VII(b)—VII(b) of FIG. 7(a).

In the second embodiment, insertion members 33, 34 are only different from the first embodiment. Namely, the insertion member 33 has at both end parts thereof cylindrical securement portions 35,36 coupled with the pin-like member 4 and at a central part thereof a deformation-sensing portion 37 which may undergo a deformation in accordance with a load to be applied to the pin-like member 4 so as to enlarge the resulting strain and has a square-cylindrical shape having dimensions significantly smaller than the diameters of the securement portions 35,36. On the upper and lower surfaces (as seen in FIGS. 7(a) and 7(b)) of the deformation-sensing portion 37, two strain gauges $R_1$ and additional two strain gauges $R_1$ (four strain gauges in total) are respectively applied symmetrically to each other relative to the neutral axis for bending deformations of the pin-like member 4. On the other hand, two strain gauges $R_2$ and additional two strain gauges $R_2$ (four strain gauges in total) are also applied symmetrically to each other relative to the neutral axis for bending deformations of the pin-like member 4 respectively on both side surfaces (as seen in FIGS. 7(a) and 7(b)) of the deformation-sensing portion 37. Similarly, the insertion member 34 has securement portions 38,39 and a square-cylindrical deformation-sensing portion 40. Two strain gauges $R_3$ and additional two strain gauges $R_3$ (four strain gauges in total) are respectively applied symmetrically to each other relative to the neutral axis for bending deformations of the pin-like member 4 respectively on the upper and lower surfaces (as seen in FIG. 7(a)) of the deformation-sensing portion 40 whereas two strain gauges $R_4$ and additional two strain gauges $R_4$ (four strain gauges in total) are applied symmetrically to each other relative to the neutral axis for bending deformations of the pin-like member 4 respectively on the side surfaces (as seen in FIG. 7(a)) of the deformation-sensing portion 40.

Incidentally, the deformation-sensing portions 37,40 are symmetrically disposed along the neutral axis for bending deformations. The four strain gauges $R_1$ are connected into a bridge similar to that shown in FIG. 4. Similarly, the strain gauges $R_2$, $R_3$ and $R_4$, which are individually constructed of four strain gauges, are respectively connected into bridges similar to that shown in FIG. 4.

Numeral 41 indicates leads connected to the strain gauges $R_1,R_2$. Designated at numeral 42 are leads connected to the strain gauges $R_3,R_4$. Numeral 43 indicates a through-hole formed through the securement portion 36, through which hole 43 the leads 41 extend. On the other hand, numeral 44 indicates a through-hole formed through the securement portion 38, through which through-hole 44 the leads 42 extend.

In the second embodiment constructed in the above manner, the strain gauges $R_2,R_4$ are arranged along the x-axis and the strain gauges $R_1,R_3$ are on the other hand arranged along the y-axis, as illustrated in FIG. 7(b). Therefore, it is feasible to detect the shear forces, which have been produced respectively in the x-axis and y-axis directions by a force exerted on the pin-like member 4, by the deformation-sensing portions 37,40 of the insertion member 33,34, irrelevant to a deformation caused by a bending moment. In other words, the load detector of the second embodiment can detect forces applied in any directions within the planes which extend at right angles relative to the axis of the pin-like member 4.

Figure 8:
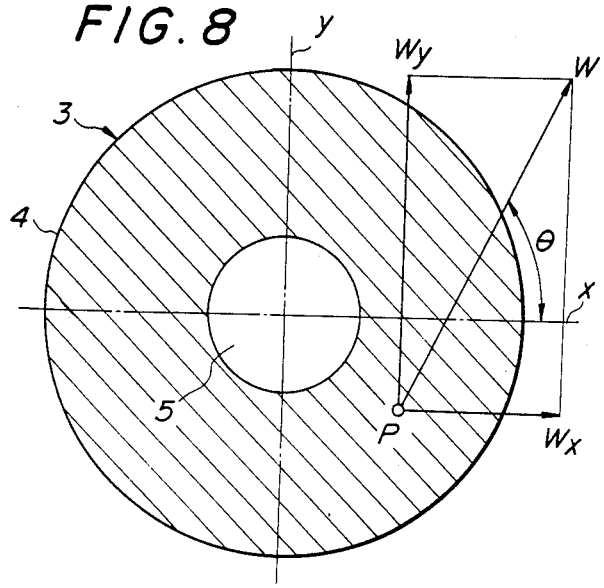
FIG. 8 is a schematic illustration showing by way of example a force applied to the load detector depicted in FIG. 7(a)

Let's now suppose that an unknown force W is applied to a point P which is apart from the axis of the pin-like member 4 as shown in FIG. 7(a) or FIG. 8. This force W may be divided into a force component $W_x$ in the x-axis direction and another force component $W_y$ in the y-axis direction. The component force $W_x$ deforms both side surfaces of the deformation-sensing portion 37 of the insertion member 33 and the extents of the resulting deformations are converted into signals by the strain gauges $R_2$. The force component $W_y$ deforms the upper and lower surfaces of the deformation-sensing portion 37 of the insertion member 33 and the extents of their deformations are converted into signals by the strain gauges $R_1$. $W_x$ and $W_y$ are then obtained independently from the above-described signals, using desired signal-processing means. By combining the thus-obtained force components $W_x$ and $W_y$ together, it is possible to determine the force W ($W=\sqrt{W_x^2+W_y^2}$) and the direction in which the force W acts, for example, an angle $\theta$ to the x-axis ($\theta=\tan^{-1} W_y/W_x$).

In the above embodiment, the insertion member 33 is arranged along the neutral axis for bending deformations. Therefore, strains which are produced at the deformation-sensing portion 37 by bending moments are minimal. Besides, each set of the strain gauges $R_2,R_1$ is formed into a bridge similar to the bridge depicted in FIG. 4, in other words, is formed in the same manner as the relationship between the arrangement of the strain gauges 15–18 shown in FIG. 1 and the bridge depicted in FIG. 4. Accordingly, strains produced respectively by bending moments in the x-axis and y-axis directions do not give significant output signals.

In the same manner as described above, shear forces applied respectively in two directions, i.e., in the x-axis and y-axis directions to the insertion member 34 are detected independently from each other by the strain gauges $R_3, R_4$.

Other operational effects are similar to those available by the aforementioned first embodiment of this invention.

Figure 9:
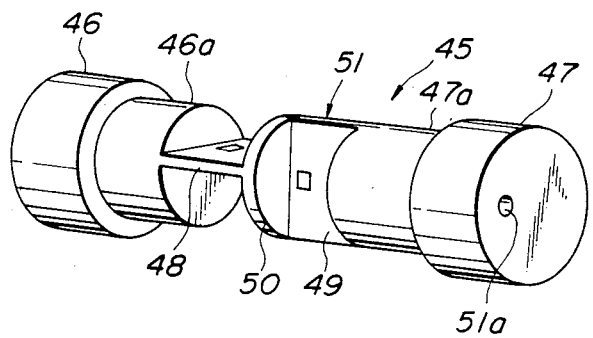
FIG. 9 is a perspective view illustrating another example of the insertion members provided with the load detector of the second embodiment.

FIG. 9 is a perspective view of another example of the insertion members provided with the load detector of the second embodiment.

In place of the insertion members 33,34 illustrated in FIGS. 7(a) and 7(b), an insertion member 45 shown in FIG. 9 may also be provided. The insertion member 45 illustrated in FIG. 9 is equipped at both end parts thereof with securement portions 46,47 to be coupled with the pin-like member 4. In continuation with the securement portions 46,47, there are respectively provided fixing portions 46a,47a having diameters smaller than those of the securement portions 46,47. The insertion member 45 is also provided at a central part thereof with a deformation-sensing portion 51 which consists of thin-walled portions 48,49 provided respectively in continuation with the fixing portions 46a,47a and extending perpendicularly to each other and a fixing portion 50 provided in continuation with the thin-walled portions 48,49 and having a diameter substantially equal to the diameters of the fixing portions 46a,47a. In addition, numeral 51a indicates a through-hole formed through the securement portion 47 and allowing leads connected to strain gauges to pass therethrough. A load detector equipped with the insertion member 45 having the thus-constructed deformation-sensing portion 51 can also detect only shear forces in two directions, namely, in the x-axis and y-axis directions independently.

Figure 11:
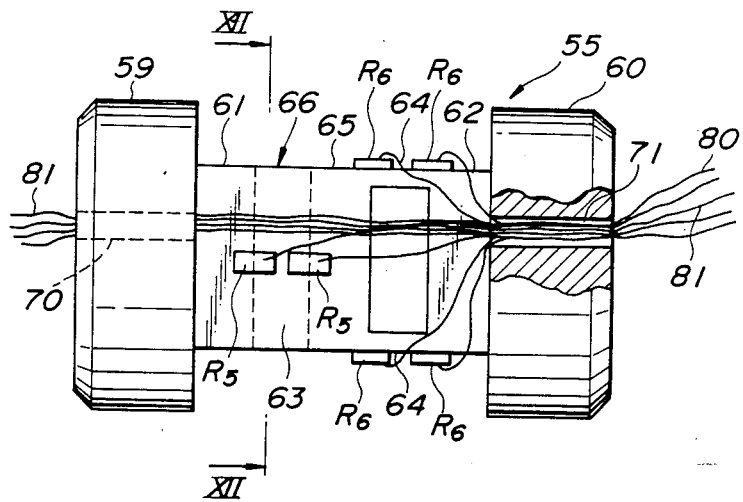
FIG. 11 is a side elevation showing an insertion member provided with the load detector of the third embodiment.
Figure 12:
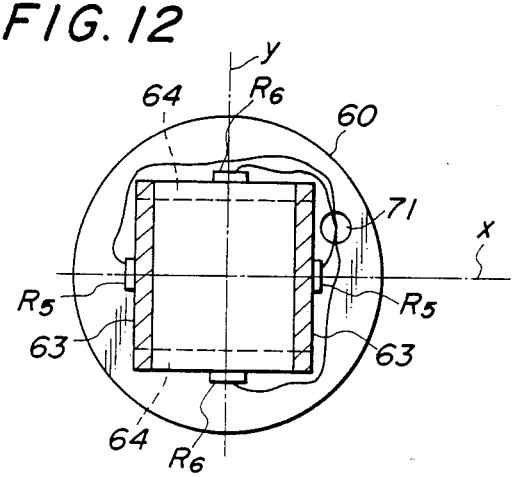
FIG. 12 is a cross-sectional view taken along line XII—XII of FIG. 11.

FIG. 10 is a side elevational view showing a load detector according to the third embodiment of this invention, a part of which load detector is illustrated in cross-section. FIG. 11 is a side view showing an insertion member provided with the load detector of the third embodiment. FIG. 12 is a cross-sectional view taken along line XII—XII of FIG. 11.

In the above third embodiment, the pin-like member 4 is constructed, as shown in FIG. 10, of a barrel portion 52, which also serves as a pin connecting the machine-constituting members 1,2 to each other, and covers 53,54 which close up both ends of the barrel portion 52. In the barrel portion 52, there are formed two holes 57,58 in which two insertion members 55,56 are respectively inserted, and another hole 57a which communicates these holes 57,58 to each other.

One of the insertion members 55,56, i.e. insertion member 55, has at both end parts thereof securement portions 59,60 coupled respectively with the barrel portion 52 of the pin-like member 4 and at a central part thereof a deformation-sensing portion 66 formed of fixing portions 61,62 provided respectively in continuation with the securement portions 59,60 and made individually of a rigid material, two pairs of thin-walled planar portions 63,64 provided respectively in continuation with the fixing portions 61,62, said thin-walled portions 63,63 opposing each other and said thin-walled portions 64, 64 facing each other and said thin-walled portions 63, 63,64,64 being responsive to each load to be exerted on the pin-like member 4 and enlarging the resulting strain, and a fixing portion 65 provided in continuation with these thin-walled portions 63,64 and made of another rigid material, as illustrated in FIGS. 11 and 12. In addition, the above-described pair of thin-walled portions 63,63 and the aforementioned pair of thin-walled portions 64,64 are arranged respectively in the x-axis direction and the y-axis direction so that they cross at right angles to each other. The deformation-sensing portion 66 containing these thin-walled portions 63,64 is disposed with their axis of symmetry nearly coincident with the neutral axis for bending deformations.

Designated at letter $R_5$ are four strain gauges applied on the thin-walled portions 63,63. Letter $R_6$ indicates four strain gauges applied on the thin-walled portions 64,64. These strain gauges $R_5, R_6$ form bridges similar to that shown in FIG. 4. Numerals 70,71 indicate respectively through-holes which are formed respectively through the securement portions 59,60 and allow lead wires connected to their corresponding strain gauges to extend therethrough.

Similar to the insertion member 55, the insertion member 56 has at both end parts thereof securement portions 72,73 and at a central part thereof a deformation-sensing portion 79 which is composed of fixing portions 74,75, two pairs of thin-walled portions 76,76,77,77, said thin-walled portions 76,76 and thin-walled portions 77,77 crossing at right angles and all of said thin-walled portions 76,76,77,77 being responsive to each load to be exerted on the pin-like member 4 and enlarging the resulting strain, and another fixing portion 78. The thin-walled portions are provided with their axis of symmetry nearly coincident with the neutral axis for bending deformations. Incidentally, this insertion member 56 defines, only through the securement portion 72, a through-hole 79a through which leads may extend. On the deformation-sensing portion 79 of the insertion member 56, there are applied strain gauges $R_7, R_8$ which form bridges similar to those of the strain gauges $R_5, R_6$ respectively. Numeral 80 indicates leads connected to the strain gauges $R_5, R_6$ while numeral 81 indicates leads connected to the strain gauges $R_7, R_8$. Of these leads, the leads 81 extend via the through-hole 79a, a hole 57a and the through-holes 70,71 of the insertion member 55 to the hole 57. On the other hand, the leads 80 extend through the through-hole 71 of the insertion member 55 to the hole 57.

Through the cover 53, there is formed a hole 82 through which the leads can extend. Numeral 83 indicates a connector to which the leads 80,81 are connected. The connector 83 is supported on the cover 53. Namely, the cover 53 also serves as a support member for holding the connector 83 in place. Numeral 84,85 are respectively a bolt fastening the cover 53 on the barrel portion 52 and a bolt threadedly securing the cover 54 on the barrel portion 52.

Figure 13:
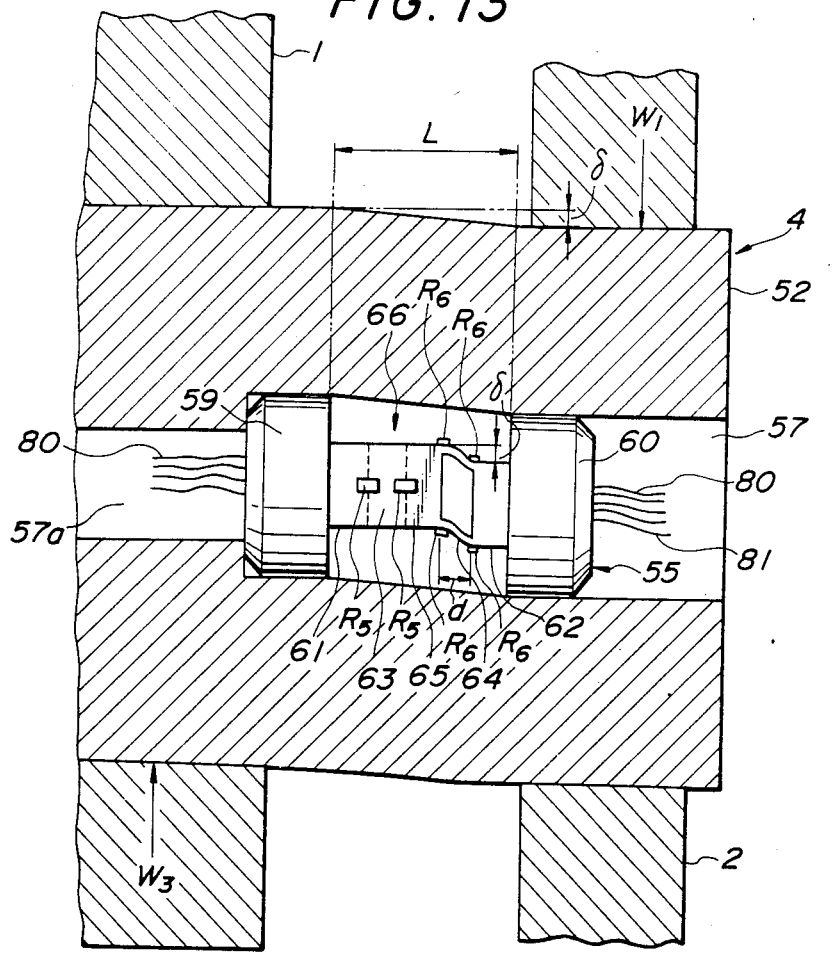
FIG. 13 is a schematic illustration showing by way of example a deformation which is to be produced in the load detector depicted in FIG. 10.

In the third embodiment constructed in the above-described manner, it can be supposed that, as illustrated in FIG. 13, thrusts $W_3, W_1$ are both exerted in the y-axis direction (as seen in FIG. 12) respectively to the machine-constituting member 1 and the insertion member 55 side of the machine-constituting member 2 and the barrel portion 52 of the pin-like member 4 is deformed by an extent δ over the distance L only as shown in FIG. 13. The deformation is transmitted via securement portions 59,60, which are coupled with the barrel portion 52 of the pin-like member 4, to the deformation-sensing portion 66.

Since the deformation-sensing portion 66 has the pair of thin-walled portions 64,64 capable of showing a low degree of rigidity to a force applied in the y-axis direction and the pair of thin-walled portions 63,63 capable of exhibiting a high degree of rigidity to a force exerted in the y-axis direction, the deformation-sensing portion 66 does not undergo a uniform deformation throughout the entirety thereof but deforms to the extent δ over the length d of each thin-walled portion 64. Namely, the deformation δ, which is produced over the distance L of the barrel portion 52 of the pin-like member 4, is developed concentrating at the length d of each thin-walled portion 64 of the deformation-sensing portion 66. Then, the deformation δ is converted to signals by means of the strain gauges $R_6$. Since the thin-walled portions 63,63 have high rigidity in the y-axis direction, strains to be produced therein will be so small that they may be ignored. Such strains are cancelled out owing to the bridge-formed connection of the strain gauges $R_5$, thereby preventing the strain gauge $R_5$ from producing outputs. Namely, the shear force produced in the barrel portion 52 of the pin-like member 4 in response to the force $W_1$ applied in the y-axis direction is detected with high sensitivity by means of the strain gauges $R_6$ applied on the thin-walled portions 64,64 which have low rigidity in the y-axis direction.

Since the deformation-sensing portion 66 is nearly coincident with the neutral axis of the pin-like member 4 for bending deformations, the deformation-sensing portion 66 undergoes relatively small deformations when bending moments are applied thereto as illustrated by way of example in FIG. 6(b). Since the strain gauges $R_6$ which are adapted to detect elongations and shrinkages are formed into the same bridge as that shown in FIG. 4, deformations by such bending moments are cancelled out and, similar to the first embodiment mentioned above, only deformations caused by shear forces shown in FIG. 6(a) are thus detected without being affected by the location of a point where the force $W_1$ is applied. Accordingly, the thus-obtained detection outputs do not vary even when the working point of the force $W_1$ is changed. Therefore, no preciseness is required as to the installation position of the insertion member 55.

The load detector works in the same manner as that described above, when a force is applied thereto in the x-axis direction as seen in FIG. 12. By means of the strain gauges $R_5$ applied on the thin-walled portions 63,63 which show a low degree of rigidity to forces applied in the x-axis direction, shear forces produced in the barrel portion 52 of the pin-like member 4 in response to thrusts applied in the x-axis direction can be detected with a high degree of sensitivity.

When a force is applied in the x-axis direction or y-axis direction to the side of the insertion member 56, a shear force corresponding to the force is only detected independently in the same manner as described above.

Namely, the load detector of the third embodiment can detect, similar to the above-described load detector of the second embodiment, forces applied in the x-axis and y-axis directions independently. In addition, the load detector of the third embodiment is constructed in such a way that each deformation is concentrated at the thin-walled portions 63,64,76,77. Accordingly, loads can be detected with still higher sensitivity. Similar to the above-detected first and second embodiments, the load detector of the third embodiment of this invention can also maintain a sufficient degree of strength and can also avoid contact of the strain gauges $R_5, R_6, R_7, R_8$ with external substances or objects.

FIGS. 14(a) through 14(e) schematically illustrate other examples of the thin-walled portions which make up the deformation-sensing portions 66,79 of the insertion members 55,56 equipped with the load detector of the third embodiment.

Figures 14A, 14B:
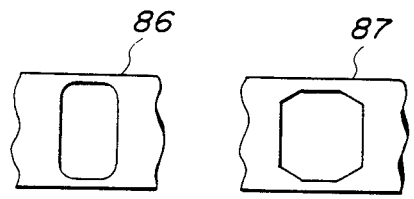
FIGS. 14(a) through 14(e) are schematic illustrations showing respectively other examples of the thin-walled portion which constitutes the deformation-sensing portion provided with the load detector of FIG. 10.
Figures 14C, 14D, 14E:
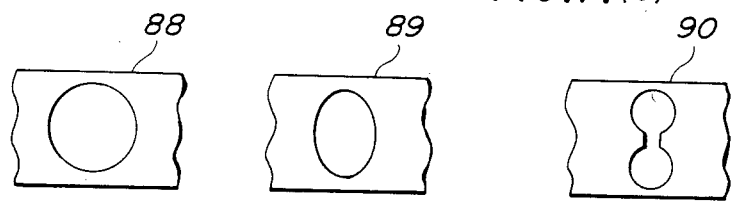

Such thin-walled portions are not limited to such a pair of thin-walled planar portions as illustrated in FIGS. 10–12, namely, to the thin-walled portions 63,64 or 76,77 which are arranged with a square hole defined by the thin-walled portions. Alternatively, the thin-walled portions may also be formed by a thin-walled portion 86 defining such a round-cornered square hole as shown in FIG. 14(a), a thin-walled portion 87 with such an octagonal hole formed therein as depicted in FIG. 14(b), a thin-walled portion 88 with such a circular hole formed therein as shown in FIG. 14(c), a thin-walled portion 89 with such an elliptical hole formed therein as illustrated in FIG. 14(d), or a thin-walled portion 90 with such a hole, which consists of two circular holes and a slot extending between the circular holes, formed therein as depicted in FIG. 14(e). The thin-walled portions 88,89,90 formed respectively by the holes shown in FIGS. 14(c), 14(d) and 14(e) are easy to fabricate.

In the above-described first to third embodiments, strain gauges have been referred to as one example of signal-producing means. It should however be borne in mind that the present invention is not limited to the use of strain gauges but the signal-producing means may also be composed of differential transformers, magnetic sensors, piezoelectric elements or the like.

In addition, the pin-like member 4 has been formed into a cylindrical shape in each of the above-described first to third embodiments. The shape of the pin-like member 4 is however not limited to the cylindrical one but may also be formed into a variety of shapes including a square-cylindrical shape.

In the third embodiment, the insertion member 55 is equipped with the deformation-sensing portion 66 which has the pair of thin-walled portions 63,63 and the pair of thin-walled portions 64,64 disposed at right angles relative to the thin-walled portions 63,63. When detecting forces applied in only one specific direction, the insertion member 55 may be equipped with a deformation-sensing portion which has only thin-walled portions capable of undergoing deformations in response to such forces, for example, the thin-walled portions 63,63 only.

Figure 15:
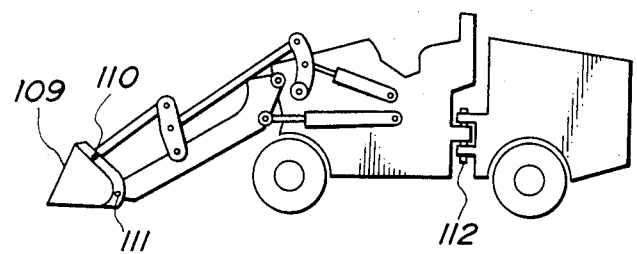
FIG. 15 is a side elevational view showing a wheeled loader as one example of machines to which the load detector of this invention may be applied.

FIG. 15 is a side elevational view of a wheeled loader which is given as one example of machines to which the load detector of this invention may be applied.

Figure 16:
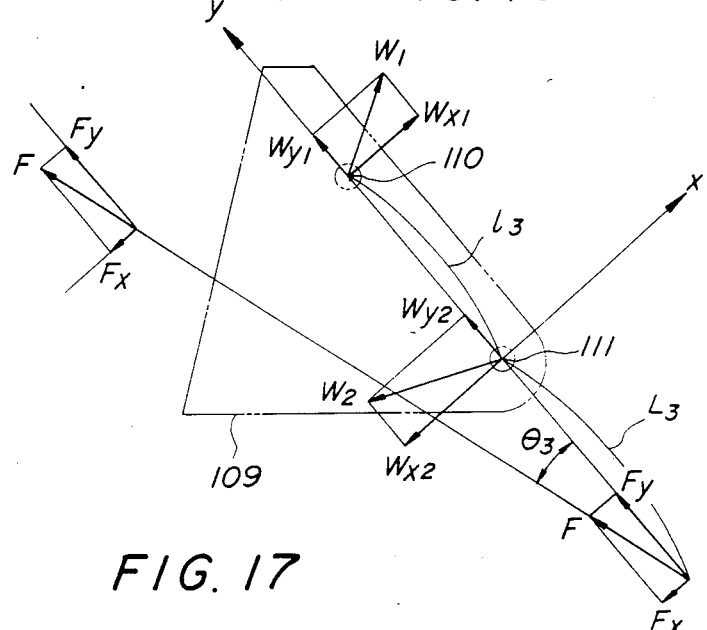
FIG. 16 is a schematic illustration showing forces applied to the bucket of the wheeled loader depicted in FIG. 15.

Pins 110,111, which support a bucket 109 of the wheeled loader, are formed for example in accordance with the third embodiment shown in FIG. 10. In a wheeled loader equipped with such pins 110,111, forces $W_1, W_2$ applied to the pins 110,111 as shown in FIG. 16 upon conducting an excavation operation by the bucket 109 are detected as force components $W_{x1}, W_{y1}, W_{x2}$ and $W_{y2}$ divided respectively in two directions, namely, the x-axis and y-axis directions owing to the provision of the pins 110,111. Therefore, assuming that the digging force of the bucket 109 is F, the distance between the pin 110 and the pin 111 is $l_3$, the tilt angle of the digging force F to the y-axis is $\theta_3$, and the distance between the point where the line of action of the digging force F crosses with the y-axis and the pin 111 is $L_3$.

$$F_x = W_{x1} + W_{x2}$$

$$F_y = W_{y1} + W_{y2}$$

Accordingly, the digging force F is determined by the following equation:

$$F = \sqrt{F_x^2 + F_y^2}$$

$$= \sqrt{(W_{x1} + W_{x2})^2 + (W_{y1} + W_{y2})^2}$$

In addition, the direction of the digging force F, namely, the angle $\theta_3$ is determined by the following equation:

$$\theta_3 = \tan^{-1} \frac{F_x}{F_y}$$

$$= \tan^{-1} \frac{W_{x1} + W_{x2}}{W_{y1} + W_{y2}}$$

Furthermore, the distance $L_3$ is determined, based on the balance in moment about the pin 111, in accordance with the following equation:

$$L_3 = \frac{W_{x1}}{F_x} l_3$$

$$= \frac{W_{x1}}{W_{x1} + W_{x2}} l_3$$

Namely, the magnitude, direction and position of the action line of the digging force F applied to the bucket 9 can be determined by performing the above-described operations on $W_{x1}$, $W_{y1}$, $W_{x2}$ and $W_{y2}$ detected by the pins 110,111 in accordance with a computing unit or the like provided as a separate unit.

In the case of the wheeled loader shown in FIG. 15, a king pin 112 may for example be formed in accordance with the above-described third embodiment.

In a wheeled loader equipped with such pins 110,111,112, the magnitude and direction of each digging force F can be determined by the pins 110,111,112 per se which are machine-constituting parts, thereby materialising desirously-controlled operations such as constant-load digging, energy-saving digging, facilitation of sensor-controlled operations and achievement of high performance.

Figure 17:
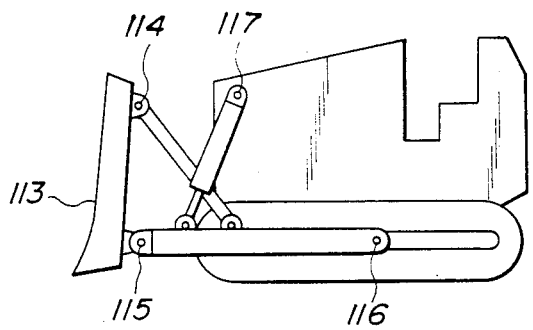
FIG. 17 is a side elevational view showing a bulldozer given as another example of machines to which the load detector of this invention may be applied.

FIG. 17 is a side elevational view illustrating a bulldozer given as another example of machines to which the load detector of this invention may be applied.

In the illustrated bulldozer, two pins 114,115 supporting a blade 113, a pin 116 provided at each proximal end of a C-frame and a pin 117 of a trunnion supporting each cylinder for the blade are for example formed in accordance with the aforementioned third embodiment. The bulldozer equipped with the pins 114,115, 116 and 117, which are all formed in the manner mentioned above, can also materialise desirously-controlled operations similar to the wheeled loader shown in FIG. 15.

Figure 18:
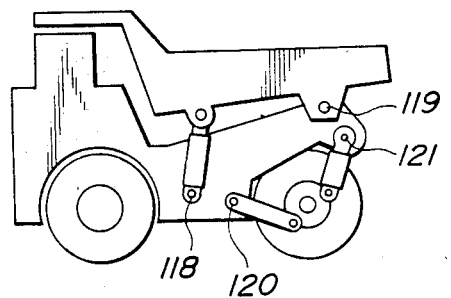
FIG. 18 is a side elevational view showing a dump truck given as a further example of machines to which the load detector of this invention may be applied.

FIG. 18 is a side elevational view illustrating a dump truck which is given as a further example of machines to which the load detector of this invention may be applied.

In the dump truck, vessel pins 118,119 and suspension pins 120,121 are formed for example in accordance with the above-described third embodiment of this invention. In the dump truck equipped with such pins 118,119,120,121, loads applied to the pins 118,119, 120,121 can be detected by means of the pins 118,119,120, 121, namely, the load detectors. By these pins, it is possible to materialise a variety of desired controls such as the calculation of each load, the adjustment of suspension stiffness in accordance with the load and driving speed, and the limitation of impact forces to a certain range upon driving on ungraded lands.

Having now fully described the invention, it will be apparent to one of ordinary skill in the art that many changes and modifications can be made thereto without departing from the spirit or scope of the invention as set forth herein.

I claim:

1. A load detector, comprising:
a pin-like member arranged between force-transmitting members and adapted to receive a load;
a hole formed in the pin-like member along a neutral axis thereof for bending deformations thereof;
an insertion member inserted in the hole and having at both end parts thereof undeformable securement portions coupled for surface-to-surface contact with the pin-like member and including at a central part thereof at least one deformation-sensing portion which is located between said undeformable securement portions and is provided with an axis of symmetry thereof coincident or nearly coincident with the neutral axis of the pin-like member, wherein said at least one deformation sensing portion is responsive to each load applied to the pin-like member and undergoes deformation and hence enlarges resulting strain; and
means for converting the extent of deformation of the deformation-sensing portion of the insertion member into signals so as to obtain only a portion of the resulting strain which portion has been produced by each shear deformation of the pin-like member.

2. A load detector as claimed in claim 1, wherein fixing portions having dimensions smaller than those of the securement portions are provided respectively in continuation with the securement portions and said at least one deformation-sensing portion is arranged between the fixing portions.

3. A load detector as claimed in claim 1, wherein the deformation-sensing portions are composed of at least one pair of thin-walled portions arranged symmetrically in mutually-opposing relationship relative to the neutral axis of the pin-like member for bending deformations thereof and the means for converting the extent of deformations is provided on each of the thin-walled portions.

4. A load detector as claimed in claim 1, wherein said at least one deformation-sensing portion further comprises at least one pair of thin-walled portions arranged symmetrically in mutually-opposing relationship relative to the neutral axis of the pin-like member for bending deformations thereof and at least one pair of additional thin-walled portions arranged symmetrically in mutually-opposing relationship relative to the neutral axis of the pin-like member for bending deformations thereof in such a way that the latter thin-walled portions cross at right angles with the former thin-walled portions; and each of the former and latter thin-walled portions is provided with the means for converting the extent of deformation.

5. A load detector as claimed in claim 1, wherein the means for converting the extent of deformation further comprises a strain gauge.

6. A load detector as claimed in claim 5, wherein the outer securement portion defines a through-hole through which a lead connected with the strain gauge extends.

7. A load detector as claimed in claim 6, wherein the pin-like member has a support member which supports a connector connected with the lead.

8. A load detector comprising:
a pin-like member arranged between force-transmitting members and adapted to receive a load;
a hole formed in the pin-like member along a neutral axis thereof for bending deformations thereof;
an insertion member inserted in the hole and having at both end parts thereof securement portions coupled with the pin-like member and including at a central part thereof at least on deformation-sensing portion which is located between said securement portions and is provided with an axis of symmetry thereof coincident or nearly coincident with the neutral axis of the pin-like member, wherein said at least one deformation sensing portion is responsive to each load applied to the pin-like member and undergoes deformation and hence enlarges resulting strain; and means for converting the extent of deformation of the deformation-sensing portion of the insertion member into signals so as to obtain only a portion of the resulting strain which portion has been produced by each shear deformation of the pin-like member, wherein the deformation-sensing portion further comprises at least one pair of thin-walled portions arranged symmetrically in mutually-opposing relationship relative to the neutral axis of the pin-like member for bending deformations thereof and at least one pair of additional thin-walled portions arranged symmetrically in mutually-opposing relationship relative to the neutral axis of the pin-like member for bending deformation thereof in such a way that the latter thin-walled portions cross at right angles with the former thin-walled portions; and each of the former and latter thin-walled portions is provided with the means for converting the extent of deformation into a signal.

* * * * *